US008262335B2

(12) United States Patent
Nussbaum

(10) Patent No.: US 8,262,335 B2
(45) Date of Patent: Sep. 11, 2012

(54) LIFTING PLATFORM WITH FORK

(75) Inventor: Hans Nussbaum, Kehl-Bodersweier (DE)

(73) Assignee: Otto Nussbaum GmbH & Co. KG, Kehl-Bodersweier (DE)

( * ) Notice: Subject to any disclaimer, the term of this patent is extended or adjusted under 35 U.S.C. 154(b) by 896 days.

(21) Appl. No.: 11/550,638

(22) Filed: Oct. 18, 2006

(65) Prior Publication Data

US 2007/0119658 A1 May 31, 2007

(30) Foreign Application Priority Data

Oct. 27, 2005 (DE) ..................... 20 2005 016 950 U

(51) Int. Cl.
*B60B 29/00* (2006.01)

(52) U.S. Cl. ......................... 414/427; 414/589; 414/785

(58) Field of Classification Search .................. 414/427, 414/589, 785; 187/216, 218, 219
See application file for complete search history.

(56) References Cited

U.S. PATENT DOCUMENTS

| | | | | | |
|---|---|---|---|---|---|
| 2,240,756 | A | | 5/1941 | Bristol | |
| 2,498,304 | A | | 2/1950 | Sommer | |
| 4,452,340 | A | * | 6/1984 | Hernick et al. | 187/204 |
| 5,257,446 | A | * | 11/1993 | Steves et al. | 29/402.08 |
| 5,404,968 | A | * | 4/1995 | Fletcher | 187/205 |

FOREIGN PATENT DOCUMENTS

| | | | |
|---|---|---|---|
| DE | 1 205 678 | A | 11/1965 |
| DE | 295 14 458 | U1 | 12/1995 |
| DE | 298 12 459 | U1 | 10/1998 |
| DE | 20 2004 008 491 | U1 | 10/2004 |
| JP | 03-064991 | A | 3/1991 |
| JP | 04-034292 | A | 2/1992 |
| JP | 05-003294 | A | 1/1993 |
| JP | 06-263398 | A | 9/1994 |
| JP | 2001-261292 | A | 9/2001 |
| JP | 2005-075604 | A | 3/2005 |
| WO | 0164574 | A1 | 9/2001 |

OTHER PUBLICATIONS

European Search Report dated Jul. 17, 2008 in European Application No. 06019427.1.

Office Action issued Feb. 2, 2012 in JP Application No. 2006-291046.

* cited by examiner

*Primary Examiner* — Saul Rodriguez
*Assistant Examiner* — Willie Berry, Jr.
(74) *Attorney, Agent, or Firm* — Panitch Schwarze Belisario & Nadel LLP

(57) ABSTRACT

A lifting platform installed in a pit, especially for tracks, has at least two lifting devices. At least one of the lifting devices is movable in the longitudinal direction of the pit for adapting to the axle spacing of the vehicle to be lifted, and at least of one lifting devices has two laterally projecting wheel forks for holding the wheels of a vehicle axle. The lifting device with the laterally projecting wheel forks is combined with an axle lifter, which is allocated to the axle of the wheels in the wheel forks and which is vertically movable independently of the wheel forks.

12 Claims, 4 Drawing Sheets

LIFTING PLATFORM WITH FORK

BACKGROUND OF THE INVENTION

The invention relates to a lifting platform installed in a pit, especially for trucks, the platform having at least two lifting devices, of which at least one lifting device can move in the longitudinal direction of the pit for adapting to the axle spacing of the vehicle, and at least one lifting device has two wheel forks projecting laterally for receiving the wheels of a vehicle axle.

Such lifting platforms with wheel forks supporting the wheels of the vehicle from below have the advantage that the vehicle is held with high stability due to the support areas lying relatively far outwardly. In this way, repair work, which is associated with considerable reaction forces on the vehicle, can be performed on the raised vehicle, without having to fear lateral tilting or rolling away of the vehicle.

In addition, lifting platforms are also known which support the vehicle from below, not at the wheels but instead at the axle. They have the advantage that the wheels hang freely, and thus can be mounted or dismounted when the vehicle is in the raised position.

BRIEF SUMMARY OF THE INVENTION

Starting from this background, an object of the present invention is to improve the known lifting platforms such that they offer universal use possibilities, as before, and are distinguished by high stability of the vehicle in the raised condition. Not least of all, the lifting platform according to the invention should feature a compact, economical construction.

This object is achieved according to the invention in that the lifting device for the laterally projecting wheel forks is combined with an axle lifter, which is allocated to the axle of the wheels in the wheel forks and is vertically movable independently of the wheel forks.

In this way, the advantage arises that the vehicle is positioned, for example, with its front axle in the raised wheel forks, while its rear axle rests on the axle lifter, so that the rear wheels can be easily dismounted or mounted, without negatively affecting the stability of the vehicle. Here, the vehicle can be lifted, for example, with the front wheel forks and the rear axle lifter, or instead, the vehicle can first be lifted both at the front and at the back by the wheel forks, and then the rear wheel forks can move downwardly and transfer the weight onto the rear axle lifter. In both cases, the stability of the vehicle is ensured by the wheel forks at one axle.

In principle, different structural possibilities offer themselves for the combination of the wheel forks with the axle lifter. It is especially beneficial if wheel forks allocated to one axle are arranged on a common lifting column and this lifting column provides a vertical guide for the axle lifter. A very compact construction is thereby obtained, especially if the axle lifter is mounted in the center of the lifting column for the wheel forks.

Expediently, the lifting column and the axle lifter are mounted one on the other, so that when moving upwardly, the lifting column forcibly carries the axle lifter with it, but if necessary the axle lifter can move farther upwardly than the lifting column with the wheel forks. This has the advantage that the axle lifter does not have to start all the way from the bottom for lifting the wheels free, but instead from the level of the already more or less extensively raised wheel forks.

One particularly advantageous embodiment of the invention consists in that, at their regions supporting the wheel, the wheel forks have a sliding guide extending approximately parallel to the wheel axle for the raised wheels. This opens up the possibility of pushing the wheels onto the stay bolts of the axle or pulling the wheels from these stay bolts on these sliding guides, without having to carry the weight of the wheels. Thus, for example, new wheels to be mounted can be placed on wheel forks that have been lowered, the wheel forks are then moved upwardly to the level of the wheel axle, and the wheels are then placed on both ends of the wheel axle. In this way, mounting and dismounting wheels is facilitated considerably.

For the structural construction of the sliding guide, various possibilities present themselves to the person skilled in the art. It is particularly beneficial if the sliding guide has at least one roller with a horizontal axis of rotation extending parallel to the wheel axis and this roller is mounted to be displaceable in the longitudinal direction respectively on a leg of the wheel forks. The wheel can thereby be transported horizontally to the axle with minimal forces or can be pulled from it and simultaneously rotated into the correct position.

With respect to the axle lifter, it is recommended that it have two laterally-arranged axle holders, between which an intermediate space remains free for placing the differential of the axle. Here, it is particularly beneficial to mount these axle holders to be displaceable on the axle lifter parallel to the wheel axle, in order to adapt to different axle dimensions.

For lifting platforms having only two lifting devices—that is, one for a front axle and one for a rear axle—it is expedient to provide both lifting devices with laterally projecting wheel forks and an axle lifter. However, if lifting platforms with three lifting devices are involved—that is, for vehicles with three axles—then in general it is sufficient to provide axle lifters on only two lifting devices.

Another advantageous embodiment of the invention consists in that the lifting device is connected to a synchronizing controller, which permits the lowering of the wheel forks of only one axle of a raised vehicle, while simultaneously locking the axle lifter corresponding to this axle and the wheel forks corresponding to the other axle. This ensures that the vehicle is always positioned with one axle on the wheel forks.

In addition, it is recommended that the synchronizing controller also provide that the axle lifter of one axle travels at the same speed as the wheel forks of the other axle. This ensures that the level of the vehicle always remains horizontal.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 2:
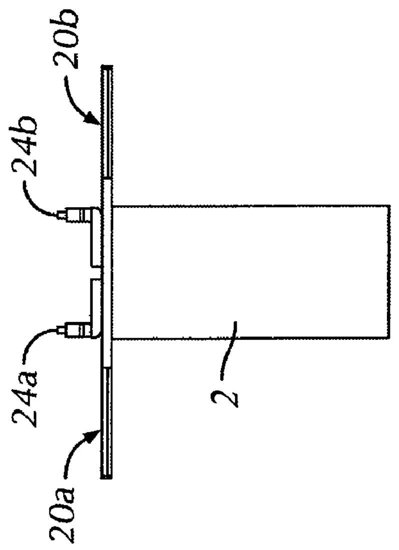
FIG. 2 is a end view of the lifting platform according to FIG. 1 in the direction of travel.
Figure 1:
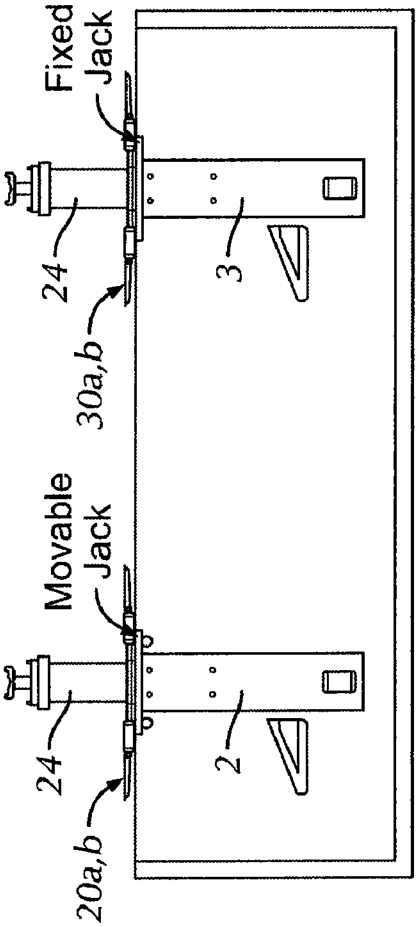
FIG. 1 is a side view of the lifting platform with two lifting devices in the lowered position.
Figure 4:
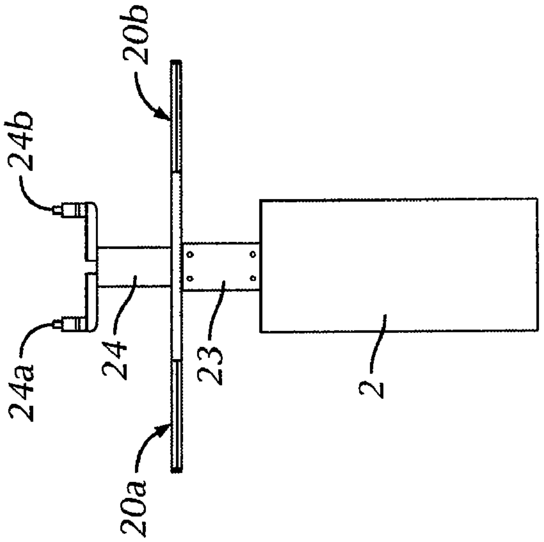
FIG. 4 is a end view of the lifting platform according to FIG. 3 in the direction of travel.
Figure 3:
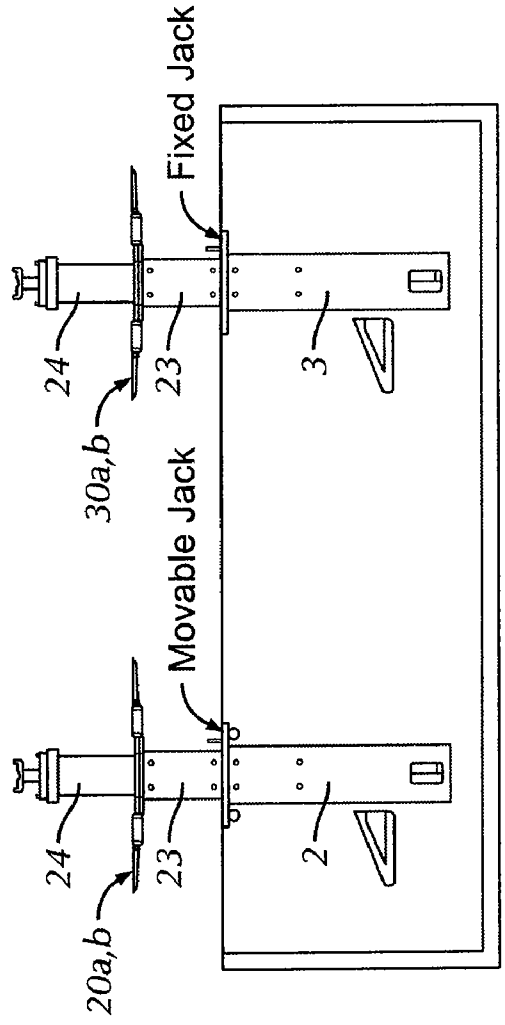
FIG. 3 is the same view as FIG. 1, but with raised lifting devices.

In FIGS. 1 to 4 can be seen a pit 1, which is built into the workshop floor and in which two lifting devices 2 and 3 are installed. In general, one lifting device—lifting device 2 in the embodiment shown—can move horizontally on travel rails (not shown in detail), while the other lifting device—lifting device 3 in the embodiment shown—sits stationary in the pit. The vehicle is moved over the pit so that one of its axles comes to rest above the stationary lifting device. Then, the movable lifting device 2 is moved under the other axle of the vehicle.

Each lifting device has two wheel forks 20*a*, 20*b* (see FIGS. 2 and 4) or 30*a* and 30*b*, which are each allocated to one vehicle wheel. This means that in FIGS. 1 and 3, the wheel forks project perpendicular to the plane of the drawing, or with reference to FIGS. 2 and 4, where the lifting platform is seen in the direction of travel, they project to the left and right.

Figure 5:
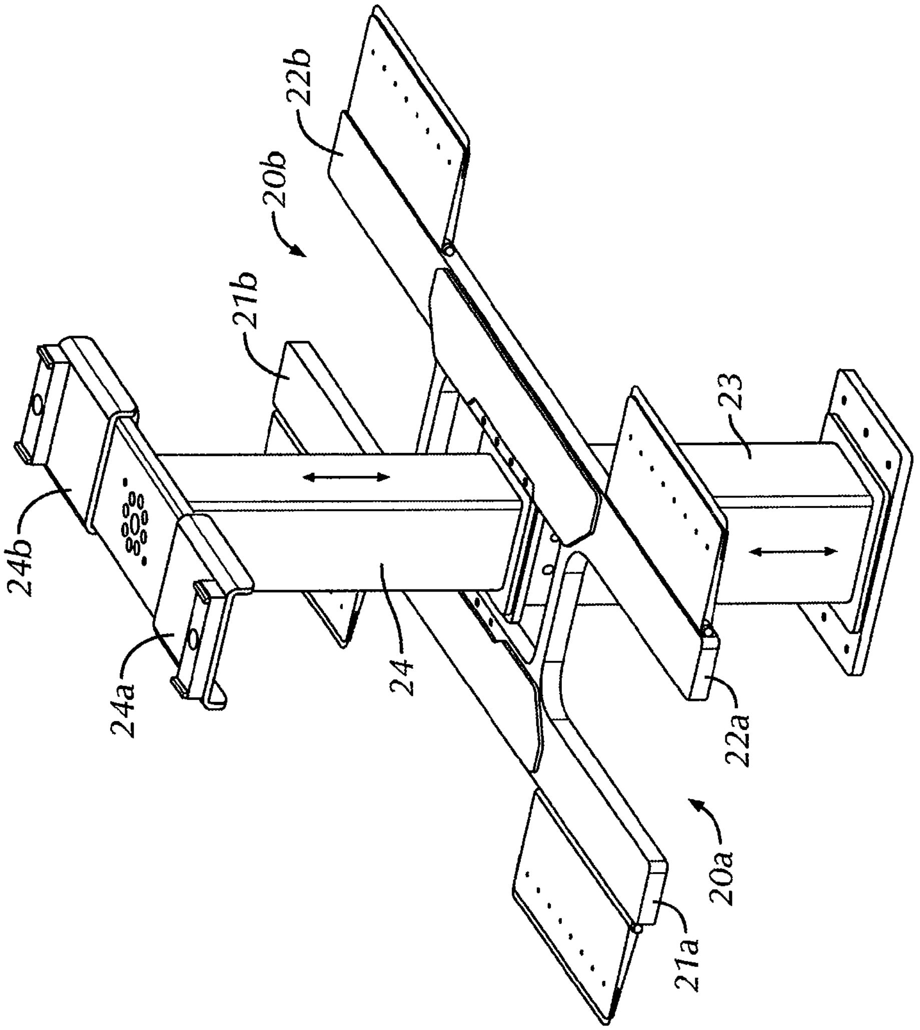
FIG. 5 is an enlarged perspective view of an individual lifting device.

As is clear from FIG. 5, the wheel forks each comprise two legs (tines) 21*a* and 22*a* or 21*b* and 22*b*, which extend parallel to each other and between which an intermediate space is free for holding a vehicle wheel.

Both forks 20*a* and 20*b* of a lifting device are arranged on a common lifting column 23, see FIG. 5. This lifting column can be moved vertically, hydraulically or in some other way.

In the embodiment shown, the lifting column 23 is constructed as a hollow profile and with an axle lifter 24 mounted in its center. The lifting column 23 and the axle lifter 24 each have an angular cross section, so that they cannot rotate about their vertical axis. The axle lifter 24 can move vertically individually and independently from the lifting column 23. Expediently, the lifting column 23 indeed takes along the axle lifter 24 when moving upwardly, but the axle lifter 24 can also continue to move upwardly independent of the lifting column 23 and can also be lowered back to the level of the wheel forks.

Obviously, it is also within the scope of the invention to control the axle lifter 24 completely independently of the lifting column 23, especially when it is mounted so that it can move vertically not in the center, but instead at one side of the lifting column.

At its upper end the axle lifter 24 has axle holders 24*a* and 24*b*, which project laterally—that is, transverse to the direction of vehicle travel. These axle holders are expediently mounted on the axle lifter to be movable transverse to the direction of vehicle travel, so that they can be shifted into a favorable receiving position under the vehicle axle.

In this way, it is possible to raise a vehicle, which has been raised with the wheel forks 20*a, b* and 30*a, b*, from the wheel forks with one of its axles, whether by raising the axle lifter 24, by lowering the lifting column 23, or by a combined movement of both elements. Here, it is essential that the lifting devices 2 and 3 be synchronized with each other hydraulically or electrically, so that the raised vehicle maintains an essentially horizontal position, regardless of whether an axle is held by the wheel forks or by the axle lifter.

Figure 6:
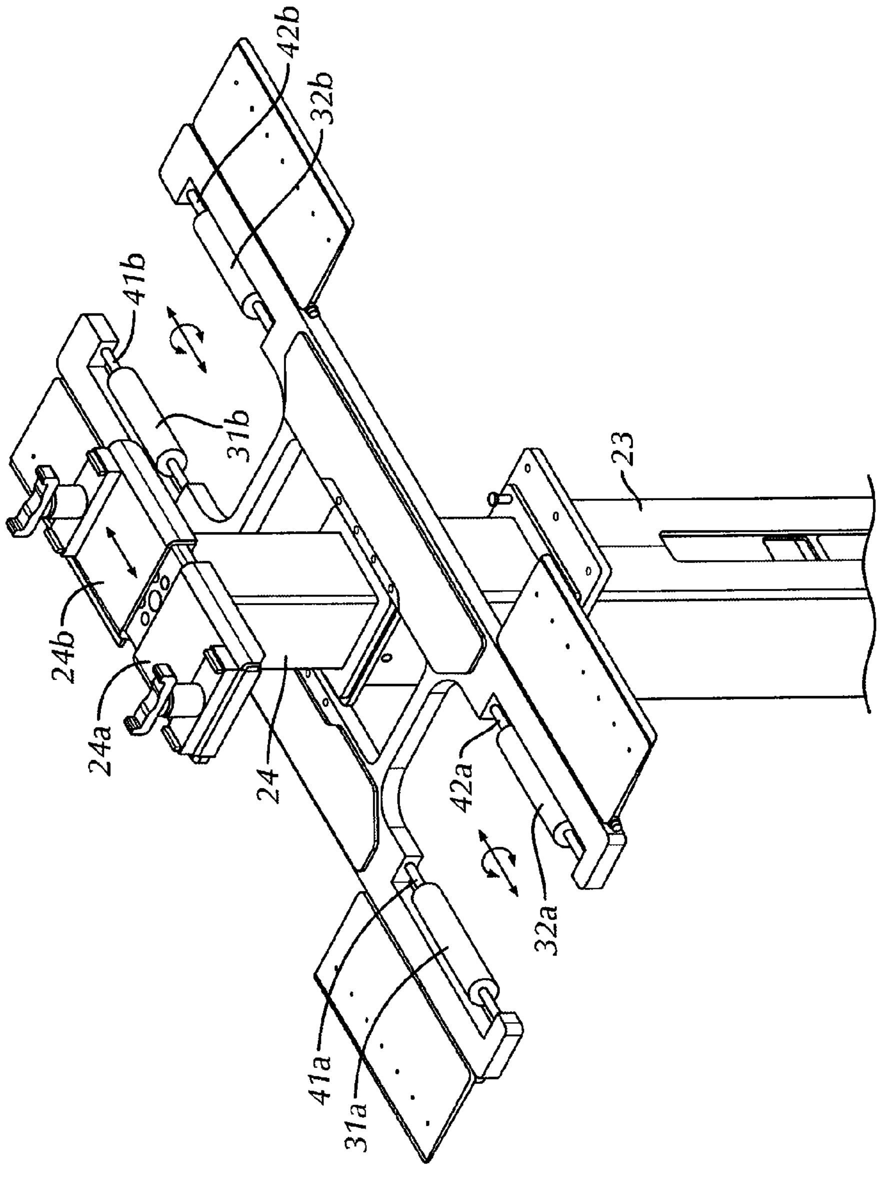
FIG. 6 is a representation like FIG. 5 in a preferred variant.

The construction according to FIG. 6 differs from that of FIG. 5 essentially in that a roller 31*a*, 32*a* and 31*b*, 32*b* with an axis parallel to the wheel axle is mounted respectively at each of the areas supporting the vehicle wheel on the legs 21*a*, 22*a* of fork 20*a* and also on the legs 21*b* and 22*b* of the fork 20*b*. The wheel can thereby be turned easily into the angular position that aligns the bores in the wheel rim with the stay bolts or bores on the vehicle.

In addition, these rollers are also even movable in the longitudinal direction. For this purpose, the rollers are mounted on longer axles 41*a*, 42*a* and 41*b*, 42*b*, and corresponding recesses in the axial direction of the rollers are left open in the legs of the wheel forks 20*a* and 20*b*, respectively, such that the rollers are mounted to be not only rotatable, but also axially displaceable on their axles. The axial displaceability is limited by stops on both ends or by the length of the recess in the legs 21*a*, 22*a*, 21*b*, and 22*b*. This has the advantage that the wheels can be easily pulled from the vehicle or pushed onto the vehicle in the axial direction.

Replacing wheels is simplified considerably by these measures. So that the rollers are easily rotatable and axially displaceable, they are expediently mounted on their shafts by ball bearings.

In summary, the advantages of the present invention include, first, that the vehicle can be supported with stability at one axle by the wheel forks, while the other axle is free at the wheels by means of the axle lifter, and second, that the wheel forks are available for transport of the wheels from the workshop floor to the level of the axle or vice versa when mounting and dismounting wheels.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A lifting platform for vehicles, the lifting platform being installed in a pit (1) and comprising at least two lifting devices (2, 3), at least one of the lifting devices being movable in a longitudinal direction of the pit for adapting to axle spacing of a vehicle to be lifted, at least one of the lifting devices having two laterally projecting wheel forks (20*a*, 20*b*) for holding wheels of one vehicle axle, and an axle lifter (24) combined with at least one of the lifting devices having the laterally projecting wheel forks (20*a*, 20*b*), the axle lifter being allocated to the axle of the wheels held in the wheel forks (20*a*, 20*b*) and the axle lifter being vertically movable independently of the wheel forks, wherein at least one of the wheel forks includes a wheel support (31*a*, 32*a*, 31*b*, 32*b*) displaceable in a direction approximately parallel to the axle of the wheels, wherein the lifting devices (2, 3) are connected to a synchronizing controller, the controller being configured such that, for a raised vehicle, the controller permits lowering of only the wheel forks (20*a*, 20*b*) of one axle while simultaneously locking the axle lifter (24) corresponding to the one axle and locking the wheel forks (20*a*, 20*b*) corresponding to another axle.

2. The lifting platform according to claim 1, wherein the wheel forks (20*a*, 20*b*) allocated to one axle are arranged on a common lifting column (23), the lifting column (23) having a vertical guide for the axle lifter (24).

3. The lifting platform according to claim 2, wherein the axle lifter (24) is mounted in a center of the lifting column (23).

4. The lifting platform according to claim 1, wherein the wheel support comprises at least one roller (31*a*, 32*a*, 31*b*, 32*b*) having an axis of rotation extending approximately parallel to the axle of the wheels.

5. The lifting platform according to claim 1, wherein the roller (31*a*, 32*a*, 31*b*, 32*b*) is mounted on ball bearings.

6. The lifting platform according to claim 1, wherein the axle lifter (24) has two laterally-arranged axle holders (24*a*, 24*b*).

7. The lifting platform according to claim 6, wherein the axle holders (24*a*, 24*b*) are mounted to be displaceable parallel to the wheel axle.

8. The lifting platform according to claim 1, comprising two lifting devices (2, 3), each lifting device having two laterally projecting wheel forks (20*a*, 20*b*, 30*a*, 30*b*).

9. The lifting platform according to claim 1, wherein the controller is configured such that the wheel forks or the axle lifter of one lifting device (2) supporting weight of the vehicle can only be moved simultaneously and at an equal lifting speed and in a same direction as the wheel forks or axle lifter of another lifting device (3) supporting weight of the vehicle.

10. The lifting platform according to claim 1, wherein the platform is configured to lift trucks.

11. A lifting platform for vehicles, the lifting platform being installed in a pit (1) and comprising at least two lifting devices (2, 3), at least one of the lifting devices being movable in a longitudinal direction of the pit for adapting to axle spacing of a vehicle to be lifted, at least one of the lifting devices having two laterally projecting wheel forks (20*a*, 20*b*) for holding wheels of one vehicle axle, and an axle lifter (24) combined with at least one of the lifting devices having the laterally projecting wheel forks (20*a*, 20*b*), the axle lifter being allocated to the axle of the wheels held in the wheel forks (20*a*, 20*b*) and the axle lifter being vertically movable independently of the wheel forks, wherein at least one of the wheel forks includes a wheel support (31*a*, 32*a*, 31*b*, 32*b*) displaceable in a direction approximately parallel to the axle of the wheels, and wherein the lifting devices (2, 3) are connected to a synchronizing controller, the controller being configured such that the wheel forks or the axle lifter of one lifting device (2) supporting weight of the vehicle can only be moved simultaneously and at an equal lifting speed and in a same direction as the wheel forks or axle lifter of another lifting device (3) supporting weight of the vehicle.

12. The lifting platform according to claim 11, wherein the synchronizing controller is further configured such that, for a raised vehicle, the controller permits lowering of only the wheel forks (20*a*, 20*b*) of one axle while simultaneously locking the axle lifter (24) corresponding to the one axle and locking the wheel forks (20*a*, 20*b*) corresponding to another axle.

* * * * *